United States Patent [19]

Thomas

[11] 4,380,969
[45] Apr. 26, 1983

[54] APPARATUS FOR UNLOADING POULTRY

[76] Inventor: Doverd E. Thomas, 2319 Fairway Cir., SE., Decatur, Ala. 35601

[21] Appl. No.: 310,737

[22] Filed: Oct. 13, 1981

[51] Int. Cl.³ .............................................. A01K 31/07
[52] U.S. Cl. ...................................................... 119/82
[58] Field of Search ................. 119/82, 17, 12; 193/4, 193/5, 6, 7, 22; 414/416

[56] References Cited

U.S. PATENT DOCUMENTS

| 3,732,961 | 5/1973 | Thornton et al. | 193/7 |
| 3,741,417 | 6/1973 | Blankenship | 119/82 X |
| 4,285,299 | 8/1981 | Thomas | 119/17 |

Primary Examiner—Hugh R. Chamblee

[57] ABSTRACT

Apparatus for unloading poultry onto a conveyor from a cage having an opening in the side thereof, wherein a frame adapted to be positioned adjacent to the conveyor supports a carriage for holding the cage, the carriage being movably mounted on the frame in such a manner that the carriage can be moved to incline the cage and cause the poultry contained therein to slide out of the cage through the opening. A chute is attached to and carried by the carriage, the chute being so positioned that the birds sliding out of the cages slide onto the chute and then slide downward onto the conveyor. The use of the chute insures that, regardless of the position of the cage when doors of the cages are opened, the birds can fall no further than the distance from the cage to the chute to thereby prevent bruising of the birds. Preferably, a plurality of cages are arranged in a bank, the chute extending in a direction parallel to the face of the bank such that the birds from each cage in the bank slide onto the chute when the bank is inclined and the doors of the cages are opened. In a most preferred embodiment, banks of cages are secured together in a back-to-back relationship, with the carriage being provided with two chutes so positioned that birds sliding from the cages in each bank slide into contact with one of the chutes.

15 Claims, 3 Drawing Figures

APPARATUS FOR UNLOADING POULTRY

BACKGROUND OF THE INVENTION a. Field of the Invention

This invention relates to apparatus for unloading poultry from cages.

b. Prior Art

It is known to utilize, for the purpose of transporting poultry from the broiler house to the poultry processing plant, cages having doors which serve as a sidewall of the cage. For example, U.S. Pat. Nos. 3,621,618 and 3,797,460 disclose banks of cages in which poultry may be transported. These cages are provided with doors in the sides thereof, so that the bank of cages can be inclined to simply pour the birds out of the cages onto a conveyor which carries the poultry into the processing plant. The disadvantage of this arrangement is that birds are frequently bruised as a result of the fall from the cage onto the conveyor, especially those birds falling from the upper cages in the bank. The conveyor may be provided with a fixed slide, as illustrated in U.S. Pat. No. 3,797,460, but this does not solve the problem, since the birds from the upper cages still fall a considerable distance and even those birds in the lower cages may fall an undesirably long distance if the cage doors are opened too soon. The result of this is bruised birds and lost profits.

It would be desirable to have poultry unloading apparatus for a bank of cages where the distance the birds fall is limited, regardless of the cage the bird comes from and the positioning of the cages at the times the cage doors are opened.

SUMMARY OF THE INVENTION

Apparatus for unloading poultry onto a conveyor from a bank of cages having doors in the side thereof, wherein a frame positioned adjacent to the conveyor supports a carriage which holds the bank of cages. The carriage is movable on the frame in such a manner that the bank of cages can be inclined to cause the birds to slide out of the cages through the openings in the sides thereof. A chute secured to and carried by the carriage is positioned adjacent to the cage doors in such a manner that the poultry sliding out of the cages slides across the cage door and onto the chute and then slides downward onto the conveyor. The birds cannot fall any further than the distance from the edges of the cage doors to the chute, regardless of the position of the cage in the bank and the position of the bank at the time the cage doors are opened. Preferably, two banks of cages are secured together in a back-to-back relationship and the carriage supports a pair of chutes, each chute being positioned to receive birds sliding from one of the banks of cages.

DETAILED DESCRIPTION OF THE DRAWINGS

DETAILED DESCRIPTION OF THE INVENTION

Figure 1:
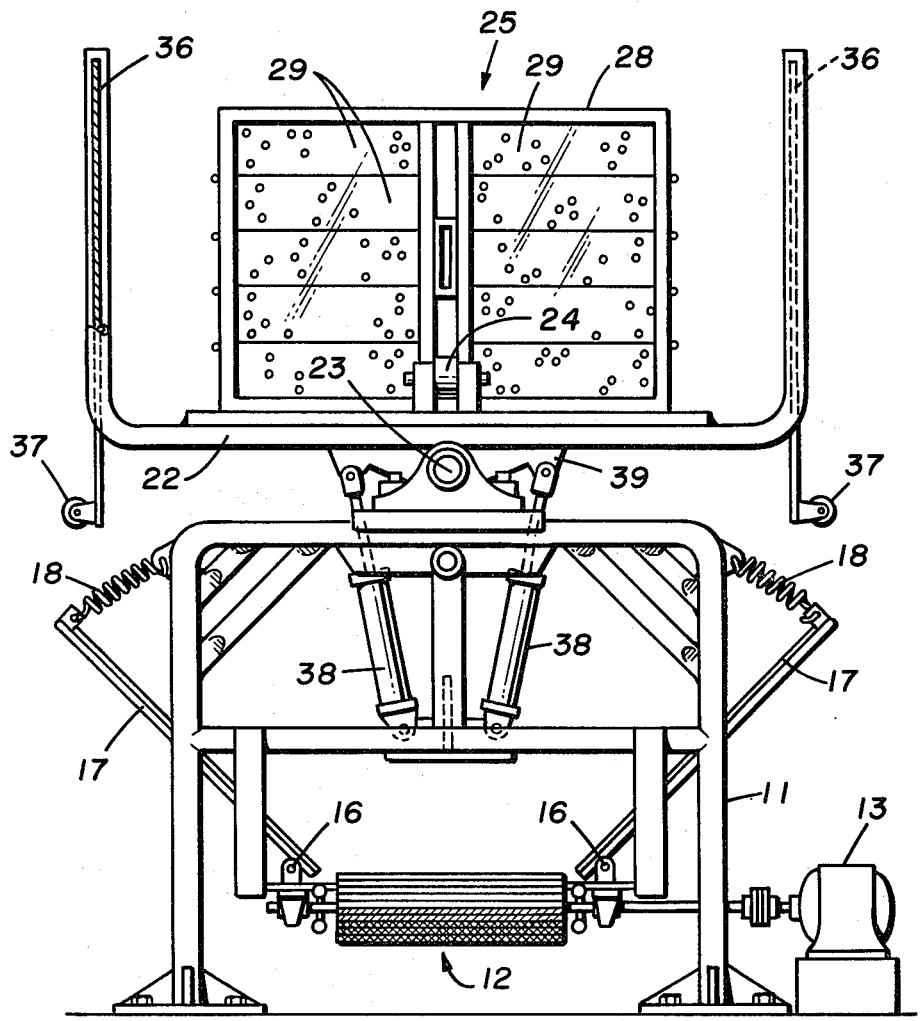
FIG. 1 is an end view of the apparatus of this invention showing the positioning of a cage-supporting carriage mounted on a frame above a conveyor.

Referring now in detail to the drawings, there is shown a frame 11 which supports a conveyor 12 driven by a motor 13. The purpose of the conveyor 12 is to carry poultry either directly into the poultry processing plant or, preferably, to deposit the poultry on another conveyor (not shown) which will carry the poultry into the processing plant. Pivotally attached to the frame 11 on axes 16 are a pair of lower chutes 17 which are connected to the frame 11 at the upper ends by tension springs 18. The purpose of the lower chutes 17, which are in the form of flat or curved metal or plastic plates, is to direct sliding poultry onto the conveyor 12.

A carriage 22 pivotally mounted on the frame 11 on axis 23 is provided with clamps 24 which serve to hold a cage assembly 25 which is supported by the carriage 22. The clamps 24 may be actuated in any of various known manners.

Figure 2:
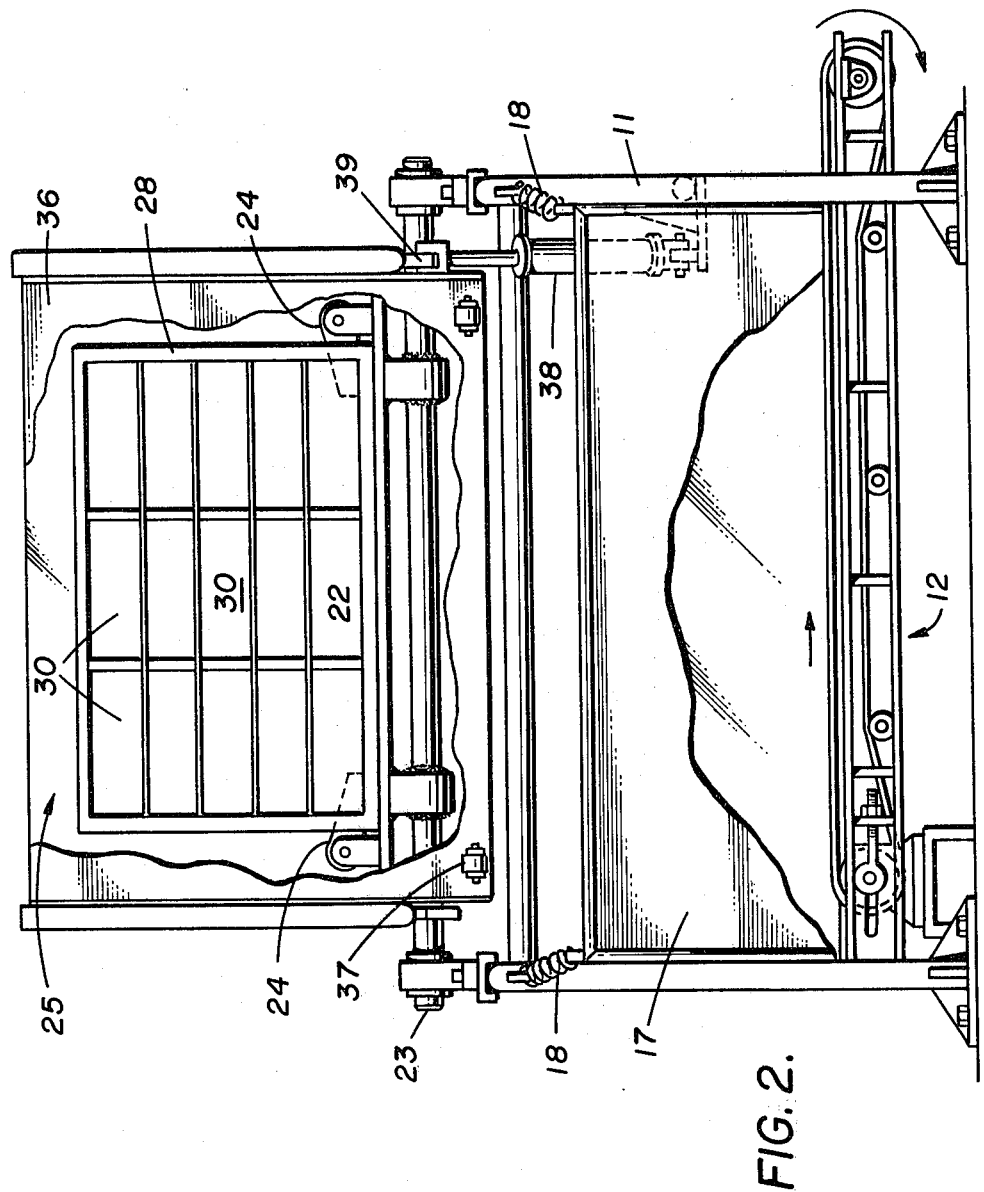
FIG. 2 is a side view of the apparatus of this invention showing other details of the construction of the apparatus.
Figure 3:
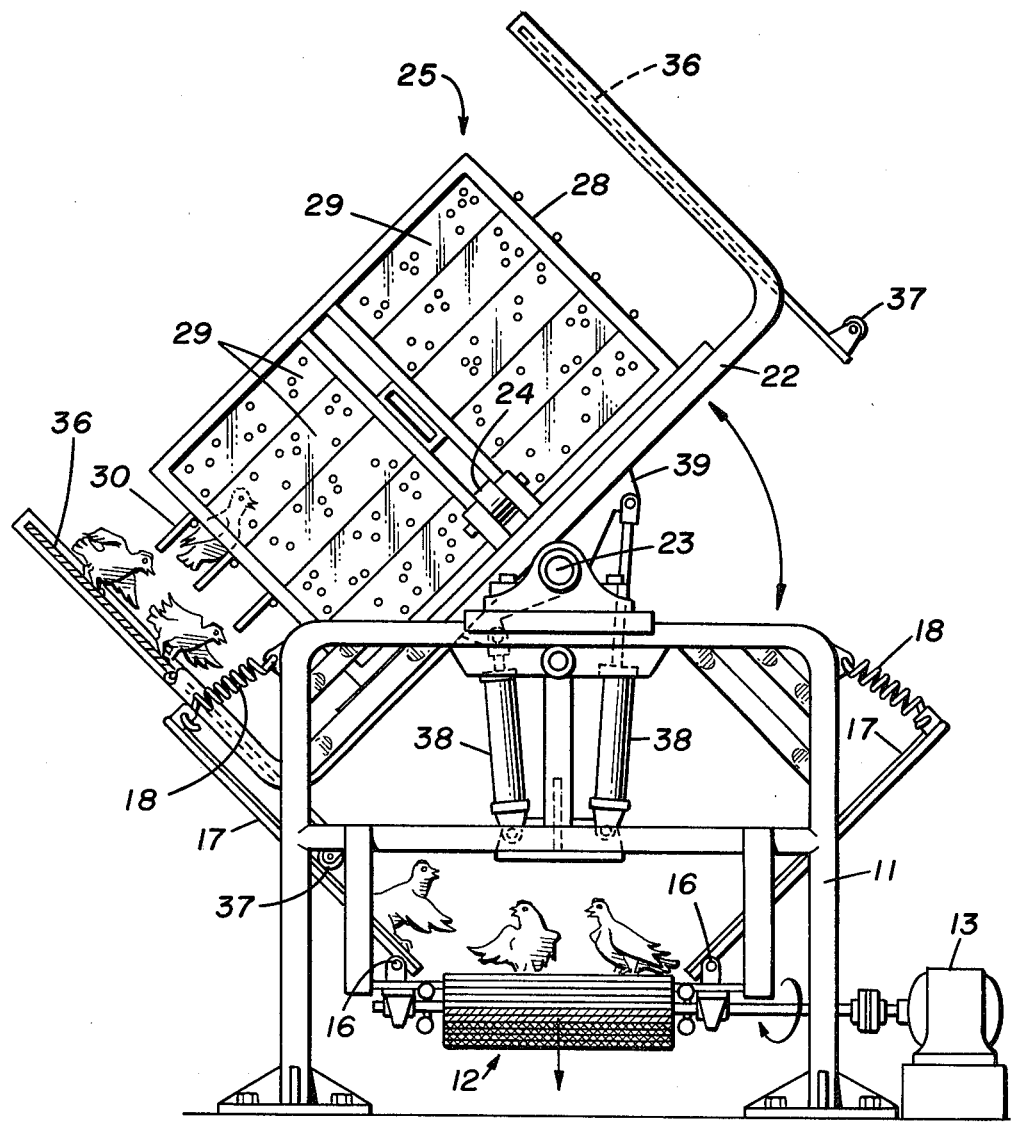
FIG. 3 is an end view showing the positioning of the carriage and illustrating the manner in which the birds slide out of the cages into contact with the chute and then downward along the chute onto the conveyor.

The cage assembly 25 is made up of a framework 28 which is partitioned off to form a plurality of cages 19 having open sides and being arranged in two banks in a back-to-back relationship as best shown in FIGS. 1 and 2. Each of the cages 29 is provided with a door 30 which serves as one wall of the cage, the doors 30 on one bank opening outward in one direction and the doors on the other bank opening out in the opposite direction. From FIGS. 1 and 2, it will readily be apparent that each of the banks may be several cages wide and several cages high. The doors 30, which can be opened to the positions shown in FIG. 3, may be latched or otherwise held in a closed position in whatever manner desired. Suitable latches are well known. The cage assembly 25 is disclosed and claimed in U.S. Pat. No. 4,285,299.

Positioned adjacent to the cage doors 30 and spaced therefrom is a pair of upper chutes 36 which are secured to and carried by the carriage 22. The chutes 36, which may be made of flat or curved sheets of metal or plastic, extend downward and are provided with rollers 37 which engage the lower chutes 17 to maintain the upper and lower chutes in close proximity as birds slide down the chutes onto the conveyor 12. The tension springs 18 hold the upper ends of the lower chutes 17 in contact with the lower ends of the upper chutes 36 when the carriage is pivoted to incline the cages. The rollers 37 serve to prevent wear and tear on the chutes.

Hydraulic cylinders 38 connected between the frame 11 and a bracket 39 on the carriage 22 are provided for pivoting the carriage 22 to incline the cage assembly 25 to a position such that, when the doors 30 on the lowermost bank of cages are opened, the birds will slide out of the cages 29 onto the doors 30 and then into contact with one of the upper chutes 36.

In operation, the cage assembly 25 is placed on the carriage 22 and locked into position by the clamps 24 as shown in the drawings. The hydraulic cylinders 38 are operated to pivot the carriage 22 to the position shown in FIG. 3 whereupon the doors 30 of the lowermost bank of cages are opened to allow the birds to slide out of the cages. As can readily be seen from FIG. 3, the birds slide out of the cages and across the doors 30 and are immediately in contact with the upper chute 36 without falling any significant distance. The birds then slide down the upper chute 36 onto the lower chute 17 and then onto the conveyor 12. After the birds have been unloaded from the bank of cages on the lowermost side of the cage assembly 25 (left side in FIG. 3) the cylinders 38 are then operated to pivot the carriage 22 in the other direction to place the bank of cages on the other side (right side in FIG. 3) of the assembly in an inclined position. The doors on this side of the assembly 25 are then opened to empty the cages of this bank of cages.

It will readily be apparent that the position of a particular cage in the assembly 25 and the position of the cage assembly 25 itself will have no effect on the distance the birds drop before they come into contact with one of the chutes. The birds slide off the doors 30, the edges of which lie in a plane parallel to the upper chute 36, and immediately contact the upper chute 36. Thus, since the birds slide almost all of the way from the cage to the conveyor 12 and do not fall any significant distance, bruising is substantially eliminated.

What is claimed is:

1. Apparatus for unloading poultry from a cage having an opening in the side thereof, comprising:
   a. movable means for supporting and moving the cage to an inclined position, and
   b. a chute carried by the supporting means for movement with the cage as said cage is moved to said inclined position, said chute being spaced from the opening in the cage and so positioned relative to the cage that when the cage supporting means moves the cage to said inclined position the poultry slides out of the cage onto the chute.

2. The apparatus of claim 1 wherein the cage is provided with a door mounted for opening to a position such that poultry slides from the cage onto the door when the cage is inclined, said chute being spaced from and substantially perpendicular to said opened door.

3. The apparatus of claim 2 wherein the supporting means supports a bank of cages, said chute being substantially parallel to a plane defined by the open sides of the cages.

4. The apparatus of claim 2 wherein the supporting means supports a second cage in a back-to-back relationship with said cage, said supporting means being provided with a second chute, said second chute being positioned on the supporting means for receiving poultry from said second cage.

5. Apparatus for unloading poultry from a plurality of cages arranged one above the other in a vertical row and having open sides, comprising
   a. a frame,
   b. means on the frame for supporting the cages, said supporting means being movably mounted on the frame for moving the cages to an inclined position such that the poultry contained in the cages slide out of the cages through the open sides thereof, and
   c. a chute attached to the supporting means for movement with the cages as said cages are moved to said inclined position, said chute extending upward past the open sides of the cages in such a manner that said poultry slide out of said cages onto the chute when said cages are in said inclined position.

6. The apparatus of claim 5 wherein the chute is substantially parallel to the open sides of the cages.

7. The apparatus of claim 5 wherein a conveyor is mounted on the frame below the cage supporting means for receiving said poultry from said chute.

8. The apparatus of claim 7 wherein a lower chute is mounted on the frame, said lower chute being positioned to receive poultry from the chute carried by the supporting means and direct said poultry onto said conveyor.

9. The apparatus of claim 8 wherein the supporting means supports a bank of cages, said cages being provided with doors, each of said doors being mounted for opening to a position such that poultry slides from the cage onto the door when the cage is inclined, said chute being spaced from and substantially perpendicular to the doors when the doors are opened to said position.

10. The apparatus of claim 9 wherein the supporting means supports a pair of banks of cages secured together in a back-to-back relationship, said supporting means being provided with a pair of chutes, each of said chutes being positioned to receive poultry from one of said banks of cages, said apparatus also being provided with a pair of lower chutes mounted on the frame, each of said lower chutes being positioned to receive poultry from one of the chutes carried by the supporting means.

11. The apparatus of claim 10 wherein the lower ends of the lower chutes are pivotally attached to the frame, the apparatus also being provided with means connected between the frame and the lower chutes for urging the upper ends of the lower chutes into contact with the lower ends of the chutes carried by the supporting means when the supporting means is moved to incline the banks of cages.

12. Apparatus for unloading poultry from a cage having an opening in the side thereof, comprising:
   a. a frame,
   b. a carriage movably mounted on the frame for supporting the cage,
   c. an upper chute secured to and carried by the carriage, said upper chute being in a position spaced from the opening in the side of the cage such that when the carriage is moved to incline the cage the poultry slides out of the cage and into contact with the upper chute,
   d. a conveyor mounted on the frame below the carriage,
   e. a lower chute having a lower end thereof pivotally attached to the frame adjacent to the conveyor,
   f. means connected between the frame and the lower chute for urging the upper end of the lower chute into contact with the lower end of the upper chute when the carriage is moved to incline the cage, and
   g. means connected between the frame and the carriage for moving the carriage to incline the cage.

13. The apparatus of claim 12 wherein the lower end of the upper chute is provided with a roller so positioned that it contacts the upper end of the lower chute when the carriage is moved to incline the cage.

14. The apparatus of claim 12 wherein the carriage is pivotally attached to the frame.

15. The apparatus of claim 12 wherein the carriage supports a bank of said cages, said upper chute being spaced from and parallel to the sides of the cages having the opening therein.

* * * * *